United States Patent [19]

Frost

[11] Patent Number: 4,628,603

[45] Date of Patent: Dec. 16, 1986

[54] HAND IMPLEMENT FOR SLICING FOODSTUFFS

[75] Inventor: Per-Eric Frost, Mora, Sweden

[73] Assignee: Frosts Knivfabrik AB, Sweden

[21] Appl. No.: 714,200

[22] Filed: Mar. 21, 1985

[30] Foreign Application Priority Data

Apr. 9, 1984 [SE] Sweden .............................. 8401967

[51] Int. Cl.⁴ ........................... A47J 17/02; B26B 3/03
[52] U.S. Cl. ...................................................... 30/280
[58] Field of Search .................. 30/280, 278, 282, 115

[56] References Cited

U.S. PATENT DOCUMENTS

| | | | |
|---|---|---|---|
| 978,153 | 12/1910 | Hahn | 30/280 |
| 1,071,603 | 8/1913 | Castello | 30/280 |
| 1,156,652 | 10/1915 | Aiken | 30/280 |
| 1,668,478 | 5/1928 | Anderson | 30/280 |
| 2,791,026 | 5/1957 | Byrd | 30/115 |
| 2,804,686 | 9/1957 | Peckhover | 30/280 |
| 4,120,089 | 10/1978 | Borner | 30/278 |

FOREIGN PATENT DOCUMENTS 537437  9/1928  Fed. Rep. of Germany ........ 30/115

Primary Examiner—Jimmy C. Peters
Attorney, Agent, or Firm—Kinzer, Plyer, Dorn & McEachran

[57] ABSTRACT

A hand implement for slicing cheese, root vegetables and the like has a cutting blade (1) having an opening (4) for a cutting element (5). In order to prevent the cutting blade from sticking to the foodstuff and to prevent the sliced foodstuff (18) from sticking to the blade (1), the blade is manufactured from a bending resistant plastics material and the end parts of the cutting element (5) are cast or moulded in the blade so as to form a free slot (17) rearwardly of the cutting element (5). The slot (17) is effective to form a layer of air between the sliced foodstuff (18) and the upper surface (8) of the blade and prevents adhesion between the blade (1) and the sliced foodstuff (18).

3 Claims, 3 Drawing Figures

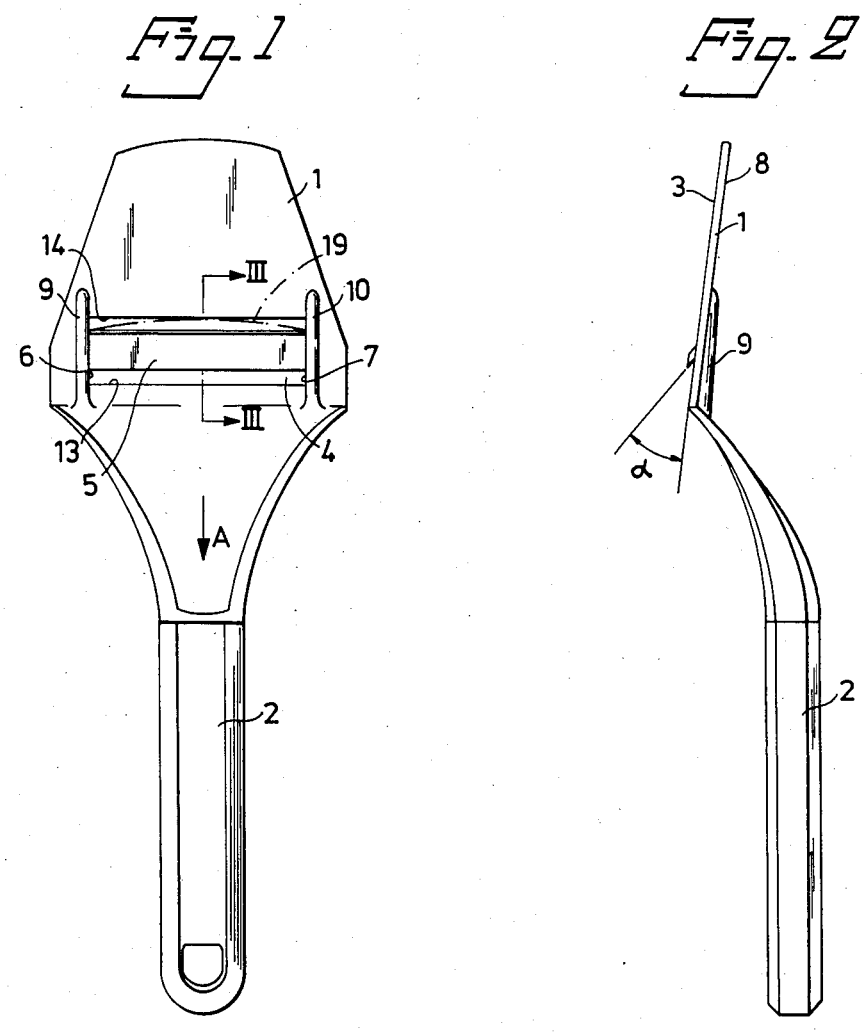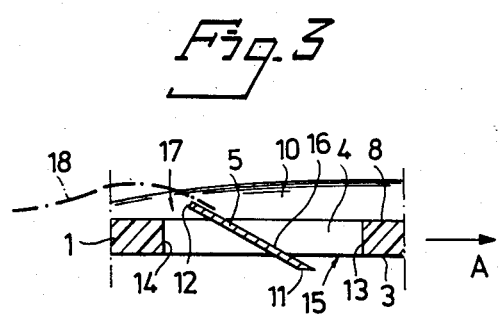

HAND IMPLEMENT FOR SLICING FOODSTUFFS

The invention relates to a hand implement for slicing foodstuffs, such as cheese and root vegetables, comprising a substantially planar blade portion having provided therein an elongated opening from which there projects on the undersurface of the blade an elongated metal cutting element which is inclined towards the cutting or slicing direction, in which implement there is presented between the cutting edge of the cutting element and that long defining edge of the opening which faces said cutting edge a first free slot through which sliced foodstuff is guided as it is cut, and in which a second free slot over which the sliced foodstuff passes is presented between the upper edge of the inclined cutting element remote from the cutting edge thereof and the other long defining edge of said elongated opening.

Such slicing implements are normally referred to as cheese-slicers, even though they are not used exclusively to slice cheese, but are also used to slice such root vegetables as cucumbers, potatoes and the like, and comprise a metal blade, normally of stainless steel, having a cutting element bent from the plane of the blade. Connected to the blade is a handle by means of which the blade is drawn across the cheese etc., to cut therefrom a slice whose thickness is determined by the position of the cutting edge to the undersurface of the blade. Although such cheese-slicers are cheap to manufacture they are encumbered with a number of disadvantages. Those stainless steel cheese-slicers which are available commercially have a blade thickness of 0.5–0.6 mm, this thickness being governed partly by a desire to keep manufacturing costs low and partly because a thin cutting element is required in order to afford the most favourable cutting action. One serious disadvantage in this respect is that the blade, and in particular those regions thereof located on both sides of the cutting element is, or are, relatively weak, causing the blade to bend as it is drawn across the cheese etc. such as to form a concave surface therein. Moreover, the blade material, which is normally so-called 18-8-steel, cannot be hardened readily and consequently the cutting edge of the cutting element rapidly becomes worn, therewith impairing its cutting efficiency, the cutting action of the dulled edge transforming to a shearing action, which causes the sliced foodstuff to tear. As beforementioned the cutting element is bent out from the blade and when slicing cheese the ensuing slices will diligently follow the cutting element from the cutting edge thereof up to the upper surface of the blade. Cheese cannot be prevented from adhering to the surface of the blade and forming thereon a cheese layer or coating which exhibits a high degree of friction, therewith precluding a light gliding movement of the blade across the cheese; this coating of the blade with cheese also occurs even when the blade is highly polished. This means that dry cheeses in particular, i.e. cheeses of low elasticity, cannot be sliced without breaking or crumbling the cheese and forming cracks therein. A similar phenomenon is found when slicing cucumber, which due to its high moisture content adheres to the blade such as to form thereon a heap of mutually joined slices.

Attempts have been made to reduce the low rigidity of the blade and the pronounced tendency of foodstuff to adhere thereto by corrugating the blade in the direction in which the slicer is drawn. Although a slight improvement has been observed in both the aforesaid instances, these attempts have not provided a final solution.

Slicers have also been produced in which a cutting element made of hardenable quality steel is welded to the blade. The manufacture of such slicers, however, is highly laborious and time consuming since the weld beads must be impervious in order to avoid bacteria-beds and the high costs incurred by the hardenable steel blades prohibit the use thereof, and hence the weakness of the blades remains. This weakness of the blade gives rise to cracks in the aforesaid welds, which in the worst cases causes the cutting element to loosen.

Accordingly, it is a primary object of this invention to provide an implement of the kind described in the introduction which is equally as inexpensive as conventional cheese-slicers but which lacks the drawbacks inherent therewith.

This object is fully realized by the invention defined in the following claims and described hereinafter with reference to the accompanying drawing, in which FIG. 1 illustrates an embodiment of the invention, seen against the upper surface of the implement in the in-use position thereof;

FIG. 2 is a side view of the implement illustrated in FIG. 1; and

FIG. 3 is a sectional view taken on the line III—III in FIG. 1.

The illustrated cheese-slicer is provided with a cutting blade 1 intended to lie against the cheese. The blade 1 is connected to a handle 2. To provide an abutment surface 3, i.e. the planar undersurface of the blade 1, the blade is manufactured from a plastics material, preferably nylon or Teflon of low adhesion properties. The undersurface of the blade 1 may be provided with corrugations extending in the drawing direction A. These corrugations, however, may also be positioned obliquely to the drawing direction A, similar to the cutting element 5 located in the opening 4. Arranged on the short sides 6 and 7 of the elongate rectangular opening 4 are flanges 9 and 10 which extend vertically from the upper surface 8 of the blade. The cutting element 5 has the form of an elongate rectangular knife having a straight cutting edge 11 and an upper edge 12 parallel therewith. The cutting edge 11 extends parallel with one long side 13 of the opening 4 while the edge 12 is parallel with the other long side 14 of said opening. The two end portions of the cutting element are cast in the blade and in the two mutually parallel flanges 9,10 said flanges also being parallel with the drawing direction, thereby to provide a simple and positive anchorage of the cutting element 5 while avoiding the occurrence of cracks or the like in which food residues can collect. The two flanges 9 and 10 stiffen the blade 1 in the proximity of the region of the end portions of the cutting element 5, so that the blade in this region is equally resistent to bending as the remainder of the highly inflexible blade. Consequently, slices 18 of uniform thickness will be cut even when exerting a heavy pressure on the handle 2, thereby avoiding the aforementioned occurrence of a concave upper surface on the cheese being sliced. As will best be seen from FIG. 3, the cutting edge 11 lies at a distance from the surface 3 corresponding to the desired slice thickness, while provided between the cutting edge 11 and the edge 13 of the opening 4 is a slot 15 through which the slice 18 passes and glides over the upper surface 16 of the cutting element 5. The cutting element 5 forms an angle α for example 30°, with the plane of the abutment surface 3, and the upper edge 12 of the cutting element is located at a distance from the edge 14 of the opening 4 such as to form a free slot 17. When a slice slides up over the upper surface 16 of the cutting element 5 this slot 17 allows a thin layer of air to enter between the undersurface of the slice 18 and the upper surface 8 of the blade 1, thereby eliminating additional risk of the slice 18 being deposited by friction onto the blade and adhering thereto. The slot 17 affords the additional advantage that no space can occur in which food residues can collect. The upper edge 12 of the cutting element 5 is preferably placed above the surface 8, as illustrated in FIG. 3, thereby to ensure that the slice is positively lifted in relation to the surface 8 when said slice leaves the edge 12 and allows the aforementioned air layer to form. This positioning of the edge 12 above the surface 8 is particularly important when the slicer is used to slice foodstuffs having a high moisture content, for example fresh cucumber. The blade 1 may be cast in moulds or produced by injected moulding techniques, and the cutting element 5 is placed in the correct position in the mould in conjunction with said casting or moulding process. This enables the blade together with its cutting element to be produced in a simple and quick process. It has been assumed in the aforegoing that the handle 2 comprises a separate part, although it will be understood that the handle may also comprise an integral part of the blade 1.

The described implement can be modified in many ways within the scope of the claims. For example, the blade can be made much thicker in the region of the cutting element, so as to achieve the rigidity desired and the desired anchorage of the cutting element, although the disadvantages herewith include higher material consumption. The edge 12 of the cutting element 5 may also be given a slightly arcuate shape, with the highest point of the curve at the centre of the cutting element, thereby further amplifying the air layer beneath the slice 18. This arcuate shape is indicated at 19 in FIG. 1.

It has also been assumed in the aforegoing that the opening 4 is of elongate rectangular configuration, although it will be understood that the two long edges 13 and 14 may also, for example, be arcuate in shape, provided that the requisite slots 15 and 17 are formed.

I claim:

1. A hand implement for slicing foodstuffs, such as cheese and root vegetables, comprising a substantially planar blade (1) having an elongated opening (4) from which there projects on the undersurface (3) of the blade an elongated metal cutting element (5) which is inclined towards the cutting or slicing direction, in which implement there is presented between the cutting edge (11) of the cutting element (5) and that long defining edge (13) of the opening (4) facing said cutting edge a free slot (15) through which sliced foodstuff (18) passes as it is cut, and in which a further free slot (17) over which the sliced foodstuff (18) passes is presented between the upper edge (12) of the inclined cutting element (5) remote from the cutting edge (11) thereof and the other long edge (14) of said elongated opening (4), characterized in that the blade (1) is resistant to bending and is manufactured from a plastics material in which the two end parts of the cutting element (5) are cast or moulded; and in that the said upper edge (12) of the cutting element lies above the upper surface (8) of the blade (1).

2. A hand implement according to claim 1, characterized in that the upper edge (12) of the cutting element (5) is parallel with the upper surface of the blade.

3. A hand implement according to claim 1, characterized in that the upper edge of the cutting element (5) is arcuate in shape with the highest point of the arc located at the centre of the cutting element.

* * * * *